(12) United States Patent
Serebryany

(10) Patent No.: US 7,966,609 B2
(45) Date of Patent: Jun. 21, 2011

(54) OPTIMAL FLOATING-POINT EXPRESSION TRANSLATION METHOD BASED ON PATTERN MATCHING

(75) Inventor: Konstantin S. Serebryany, Moscow (RU)

(73) Assignee: Intel Corporation, Santa Clara, CA (US)

( * ) Notice: Subject to any disclaimer, the term of this patent is extended or adjusted under 35 U.S.C. 154(b) by 1231 days.

(21) Appl. No.: 10/587,093

(22) PCT Filed: Mar. 30, 2006

(86) PCT No.: PCT/RU2006/000152
§ 371 (c)(1),
(2), (4) Date: Jul. 20, 2006

(87) PCT Pub. No.: WO2007/114722
PCT Pub. Date: Oct. 11, 2007

(65) Prior Publication Data
US 2008/0235676 A1 Sep. 25, 2008

(51) Int. Cl.
G06F 9/45 (2006.01)
G06F 7/38 (2006.01)
(52) U.S. Cl. ........ 717/151; 717/154; 717/159; 708/495; 708/501
(58) Field of Classification Search .................... None
See application file for complete search history.

(56) References Cited

U.S. PATENT DOCUMENTS

| | | | |
|---|---|---|---|
| 6,247,174 B1 | 6/2001 | Santhanam et al. | |
| 2008/0092124 A1* | 4/2008 | Archambault et al. | 717/140 |
| 2008/0127144 A1* | 5/2008 | Eichenberger et al. | 717/149 |

FOREIGN PATENT DOCUMENTS

| | | |
|---|---|---|
| EP | 1329806 A2 | 7/2003 |
| WO | 92/15941 A1 | 9/1992 |
| WO | 2007/114722 A1 | 10/2007 |

OTHER PUBLICATIONS

Y. Voronenko. M. Pueschel "Automatic genration of implementations for DSP Transforms on Fused Multiply-Add Architectures", 2004, IEEE International conference on Acoustics, Speech, and Signal Processing (ICASSP '04).*
K. Keutzer "DAGON: Technology binding and Local Optimization by DAG Matching", 1987, 24th conference on Design Automation.*
A. Aho, S. Johnson, J. Ullman "Code Generation for Expressions with Common Subexpressions", 1977, Journal of the ACM (JACM).*
International Search Report and Written Opinion received for PCT Patent Application No. PCT/RU2006/000152, mailed on Jan. 23, 2007, 13 pages.
International Preliminary Report on Patentability received for PCT Patent Application No. PCT/RU2006/000152, mailed on Oct. 9, 2008, 10 pages.
Andersson, Niclas et al., "Overview and industrial application of code generator generators", Journal of Systems and Software, vol. 32, Issue 3, Mar. 31, 1996, pp. 185-214.

* cited by examiner

*Primary Examiner* — Jason Mitchell
(74) *Attorney, Agent, or Firm* — Crystal D. Sayles

(57) ABSTRACT

Embodiments of the present invention include code generation methods. In one embodiment, a table of patterns is generated. Each pattern in the table includes an FMA (fused multiply-add) DAG (Directed Acyclic Graph), a canonical form equivalent of the FMA DAG, and a shape corresponding to the canonical form equivalent. Incoming floating-point expressions are matched against the patterns in the table during compilation of a program to obtain optical sequences of FMA, FMS (fused multiply-subtract), and FNMA (fused negate multiply-add) instructions as compiled instructions for computing the floating point expressions.

39 Claims, 8 Drawing Sheets

PATTERNS

| DAG | Canonical form | Shape (binary form) |
|---|---|---|
| F0::+a*1+b | +a+b | 101 |
| F0::+F1*a+b; F1::+c*d+e; | +acd+ae+b | 11101101 |
| F0::+F1*a+0; F1::+F2*a+0; F2::+b*c+0; | +abbcc | 11111 |
| F0::+F1*a+F2; F1::+b*c+1; F2::+d*1+e; | +abc+a+d+e | 111010101 |
| F0::+F2*a+F1; F1::+F2*1+b; F2::+F3*F3+c; | +addee+ddee+ac+b+c | 1111101110110101 |

*FIG. 3*

OPTIMAL FLOATING-POINT EXPRESSION TRANSLATION METHOD BASED ON PATTERN MATCHING

This U.S. application claims priority to Pending International Application Number PCT/RU2006/000152, filed PCT Russia Mar. 30, 2006.

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention is generally related to the field of program compilation and code generation. More particularly, the present invention is related to optimal compilation methods for evaluating floating-point expressions and translating the floating-point expressions into computer instruction sequences to compute the floating-point expressions.

2. Description

Modern computer architectures such as, for example, IA64 (Intel Architecture 64) computer architecture manufactured by Intel Corporation, include three instructions for performing basic floating point operations of multiplication, addition, and subtraction and negation. The three instructions are fused multiply-add (FMA), fused multiply-subtract (FMS), and fused negate-multiply-add (FNMA). These instructions compute floating point expressions such as $a*b+c$, $a*b-c$, and $-a*b+c$, respectively, as a single operation. Other modern computer architectures may have similar fused instructions.

In computing floating point expressions, many compilers combine two adjacent floating point instructions into one, such as, for example, adjacent addition and multiplication is combined into one fused multiply-add (FMA). This method works well for small expressions, but for large expressions this method creates a multitude of instructions in order to obtain the final expression. Thus, this method is far from optimal for large expressions.

Therefore, what is needed is an optimal method for performing basic floating-point operations for computer architectures with FMA instructions that accelerates program execution. What is also needed is a method for an optimizing compiler for computer architectures with FMA instructions to optimize floating point expressions by combining floating-point operations into a sequence of FMA instructions. What is further needed is an optimal method for computing floating point expressions that works well for both small expressions and large expressions.

BRIEF DESCRIPTION OF THE DRAWINGS

The accompanying drawings, which are incorporated herein and form part of the specification, illustrate embodiments of the present invention and, together with the description, further serve to explain the principles of the invention and to enable a person skilled in the pertinent art(s) to make and use the invention. In the drawings, like reference numbers generally indicate identical, functionally similar, and/or structurally similar elements. The drawing in which an element first appears is indicated by the leftmost digit(s) in the corresponding reference number.

FIG. 3 is a diagram illustrating a pattern according to an embodiment of the present invention.

DETAILED DESCRIPTION OF THE INVENTION

While the present invention is described herein with reference to illustrative embodiments for particular applications, it should be understood that the invention is not limited thereto. Those skilled in the relevant art(s) with access to the teachings provided herein will recognize additional modifications, applications, and embodiments within the scope thereof and additional fields in which embodiments of the present invention would be of Significant utility.

Reference in the specification to "one embodiment", "an embodiment" or "another embodiment" of the present invention means that a particular feature, structure or characteristic described in connection with the embodiment is included in at least one embodiment of the present invention. Thus, the appearances of the phrase "in one embodiment" or "in an embodiment" appearing in various places throughout the specification are not necessarily all referring to the same embodiment.

Embodiments of the present invention are directed to optimal methods of translating a floating-point expression into a sequence of processor instructions for computer architectures that support fused multiply-add instructions. This is accomplished by generating optimal patterns of sequences of FMA instructions during compilation of the compiler. These optimal patterns are stored in a table. During compilation of a program, input floating-point expressions are translated into a canonical form and shape. The canonical form and shape of the input floating-point expression is then matched to one of the generated optimal patterns of sequence of FMA instructions.

Although embodiments of the present invention are directed to computer architectures providing FMA instructions, the invention is not limited to computer architectures having FMA instructions. One skilled in the relevant art(s) would know that embodiments of the present invention may also be applicable to computer architectures having other types of fused instruction sets that perform multiple operations in a single instruction. Embodiments of the present invention may also be applicable to computer architectures even if the instruction set does not contain fused instructions.

Figure 1:
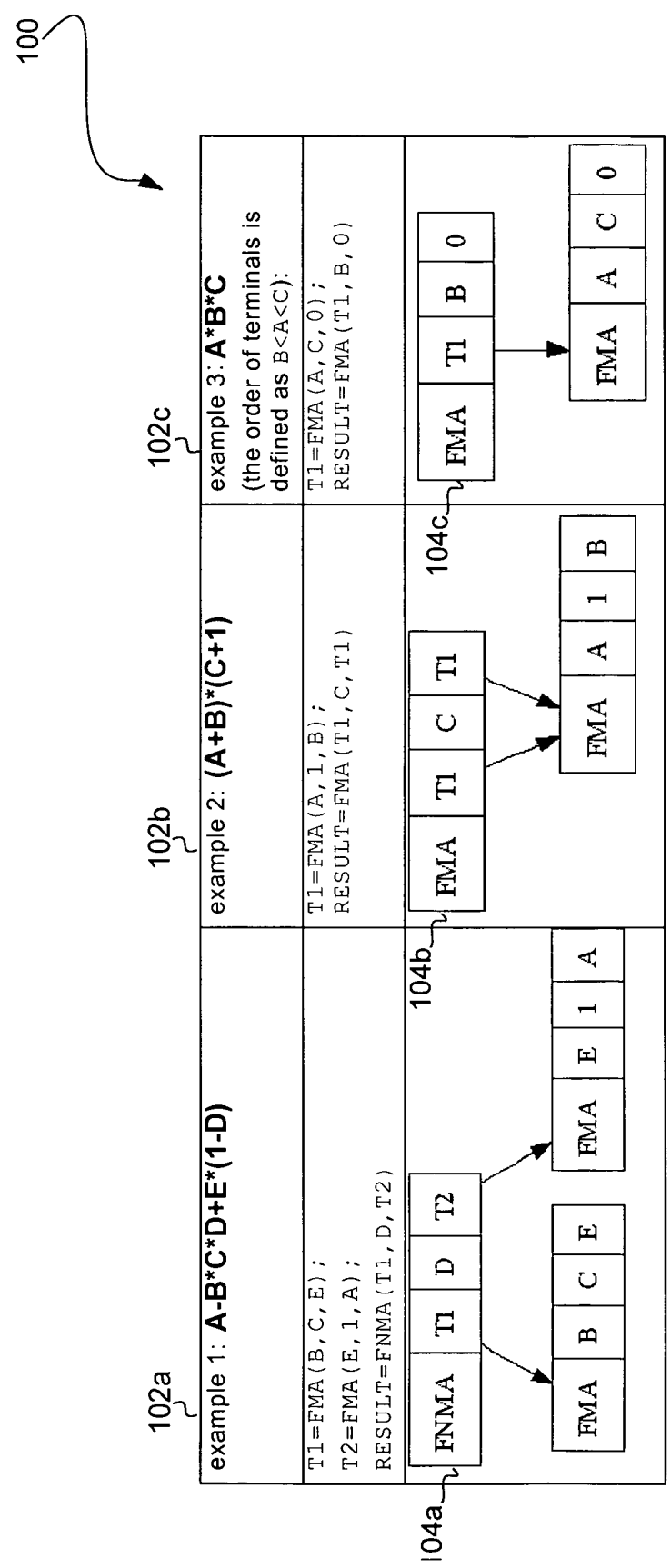
FIG. 1 is a diagram illustrating exemplary floating point expressions and the sequence of FMA, FMS, and FNMA instructions that form an Acyclic Directed Graph (DAG) that is mathematically equivalent to the given expression according to an embodiment of the present invention.

FIG. 1 is a diagram illustrating exemplary floating point expressions 102 and the corresponding sequence of FMA, FMS, and/or FNMA instructions that form an Acyclic Directed Graph (DAG) 104 that is mathematically equivalent to the given expression according to an embodiment of the present invention. Characteristics of an optimal sequence include minimal complexity, minimal latency or height of the DAG, and argument availability. Minimal complexity is met when the number of instructions in the sequence of instructions that define the DAG is minimal. Minimal latency is met when the height of the DAG is minimal compared to all possible DAGs with minimal complexity. Argument availability places a strict order on the set of terminals in the DAG. Terminals are defined as variables and constants. If a strict order is defined on the set of terminals, then smaller terminals should be placed as close to the root node of the DAG as possible, while still preserving minimal complexity and latency. If some terminals are available later than other terminals, argument availability allows for the use of late terminals later (closer to the root node of the DAG).

A first example floating-point expression 102a is shown in FIG. 1 as being equal to A−B*C*D+E*(1−D). Expression 102a is shown as having a sequence of instructions (i.e., DAG 104a) that consists of two FMA instructions and one FNMA instruction. The first FMA instruction, identified by temporary variable T1, consists of FMA (B, C, E) or B*C+E. The second FMA instruction, identified by temporary variable T2, consists of FMA (E, 1, A) or E*1+A. The remaining instruction in the DAG is an FNMA instruction that results in an equivalent expression of the example floating point expression 102a. The FNMA instruction, identified by temporary variable RESULT, consists of FNMA (T1, D, T2) or −D*T1+T2.

A second example floating-point expression 102b is shown in FIG. 1 as being (A+B)*(C+1). Expression 102b is shown as having a sequence of instructions or DAG 104b consisting of two FMA instructions. The first FMA instruction, identified by temporary variable T1, consists of FMA (A, 1, B) or 1*A+B. The remaining FMA instruction in the DAG 104b results in an equivalent expression of the example floating point expression 102b. The FMA instruction, identified by temporary variable RESULT, consists of FMA (T1, C, T1) or C*T1+T1.

A third example floating-point expression 102c is shown in FIG. as being A*B*C, with the order of terminals being defined as B<A<C. Thus, with expression 102c, the rule of argument availability is adhered to by having the smaller terminals placed as close to the root node as possible, while preserving minimal complexity and latency. Expression 102c is shown as having a sequence of instructions or DAG 104c consisting of two FMA instructions. The first FMA instruction, identified by temporary variable T1, consists of FMA (A, C, 0) or A*C+0. The remaining FMA instruction in the DAG 104c results in an equivalent expression of the example floating point expression 102c. The FMA instruction, identified by temporary variable RESULT, consists of FMA (T1, B, 0) or B*T1+0.

Figure 2:
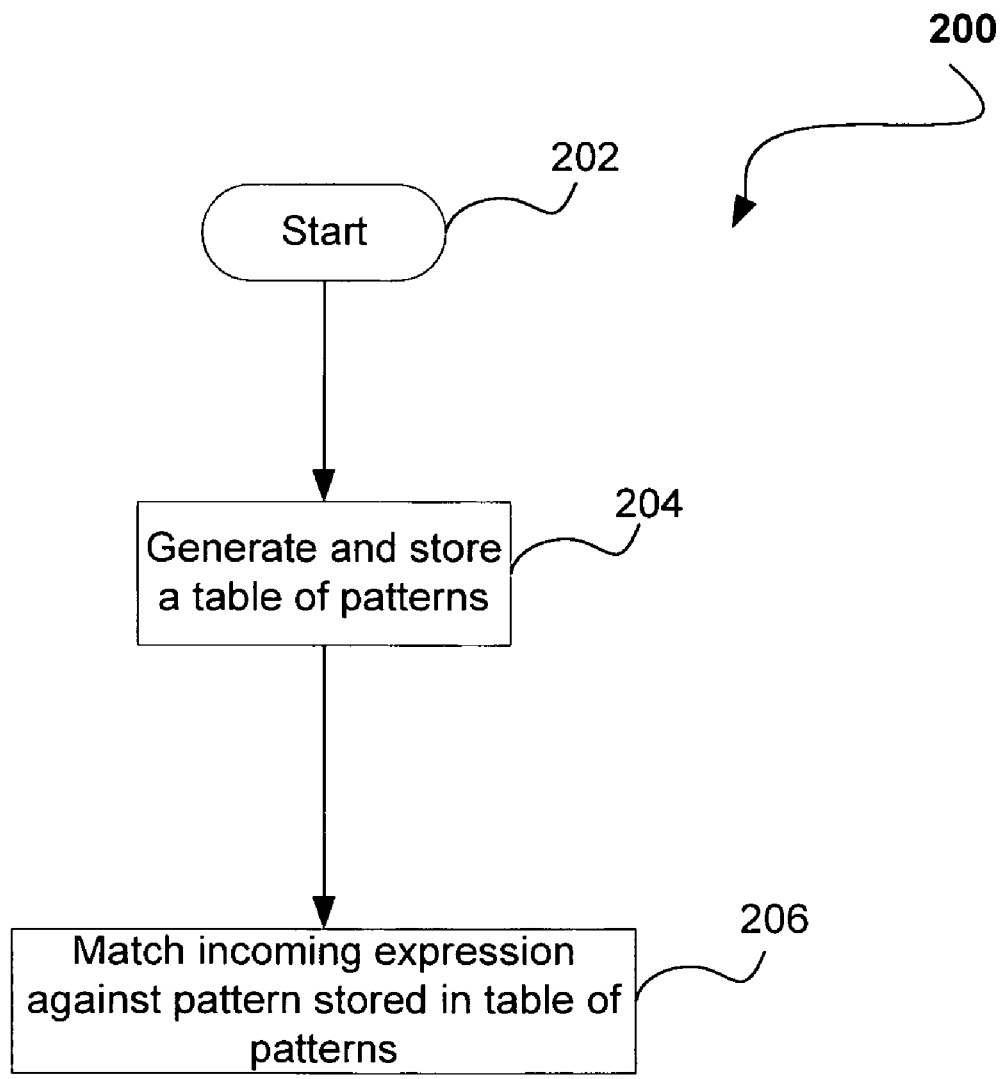
FIG. 2 is a flow diagram illustrating an exemplary optimal method for translating floating-point expressions into a sequence of processor instructions where the processor instruction set includes instructions that perform several mathematical operations at one time according to an embodiment of the present invention.

FIG. 2 is a flow diagram 200 illustrating an exemplary optimal method for translating floating-point expressions into a sequence of processor instructions where the processor instruction set includes instructions that perform several mathematical operations at one time according to an embodiment of the present invention. The invention is not limited to the embodiment described herein with respect to flow diagram 200. Rather, it will be apparent to persons skilled in the relevant art(s) after reading the teachings provided herein that other functional flow diagrams are within the scope of the invention. The process begins with block 202, where the process immediately proceeds to block 204.

In block 204, a table of patterns is generated and stored in a compiler binary. This process occurs during compilation of a compiler. The process then proceeds to block 206.

In block 206, a given or incoming expression is matched against the patterns stored in the table of patterns. This process occurs during compilation of a program. Each incoming floating-point expression in the program is matched to a pattern.

FIG. 3 is a diagram illustrating exemplary patterns 300 according to an embodiment of the present invention. Each pattern 300 is defined as having two major parts. The first major part is an FMA DAG 302 and the second major part is a canonical form 304 that is mathematically equivalent to the FMA DAG 302. The pattern also comprises a shape 306.

The FMA DAG 302 is a sequence of FMA instructions that form a DAG or Acyclic Directed Graph. FMA DAGs 302 do not contain FMS or FNMA instructions. The arguments for each instruction in the FMA DAG 302 are terminals, such as, for example, a, b, c, ..., and constants one (1) and zero (0). Each terminal may only appear once in the sequence. Each FMA DAG 302 contains at least one node. The root node of the FMA DAG 302 is identified as F0. Any additional nodes are identified as Fn, where n=1, 2, ....

Canonical form 304 is the sum of products of the terminals, which is mathematically equivalent to the FMA DAG. For example, FMA DAG 302a consists of one node, F0, which is equal to +a*1+b. The corresponding canonical form 304a for FMA DAG 302a is +a+b. Example FMA DAG 302b includes two nodes, F0 and F1. Node F0 is equal to +F1*a+b. Node F1 is equal to +c*d+e. The canonical form 304b for FMA DAG 302b is +acd+ae+b. As can be seen from FIG. 3, canonical forms for patterns do not contain subtractions or negations.

A shape 306 is determined for each canonical form 304. Shape 306 is a binary representation. The binary representation for shape 306 is obtained by replacing all terminals with 1 and all operational signs with 0. For example, shape 306a, which corresponds to FMA DAG 302a and canonical form 304a, is a binary representation of "1" for terminal a, "0" for the addition sign "+", and "1" for terminal b, resulting in a binary representation of 101.

Figure 4:
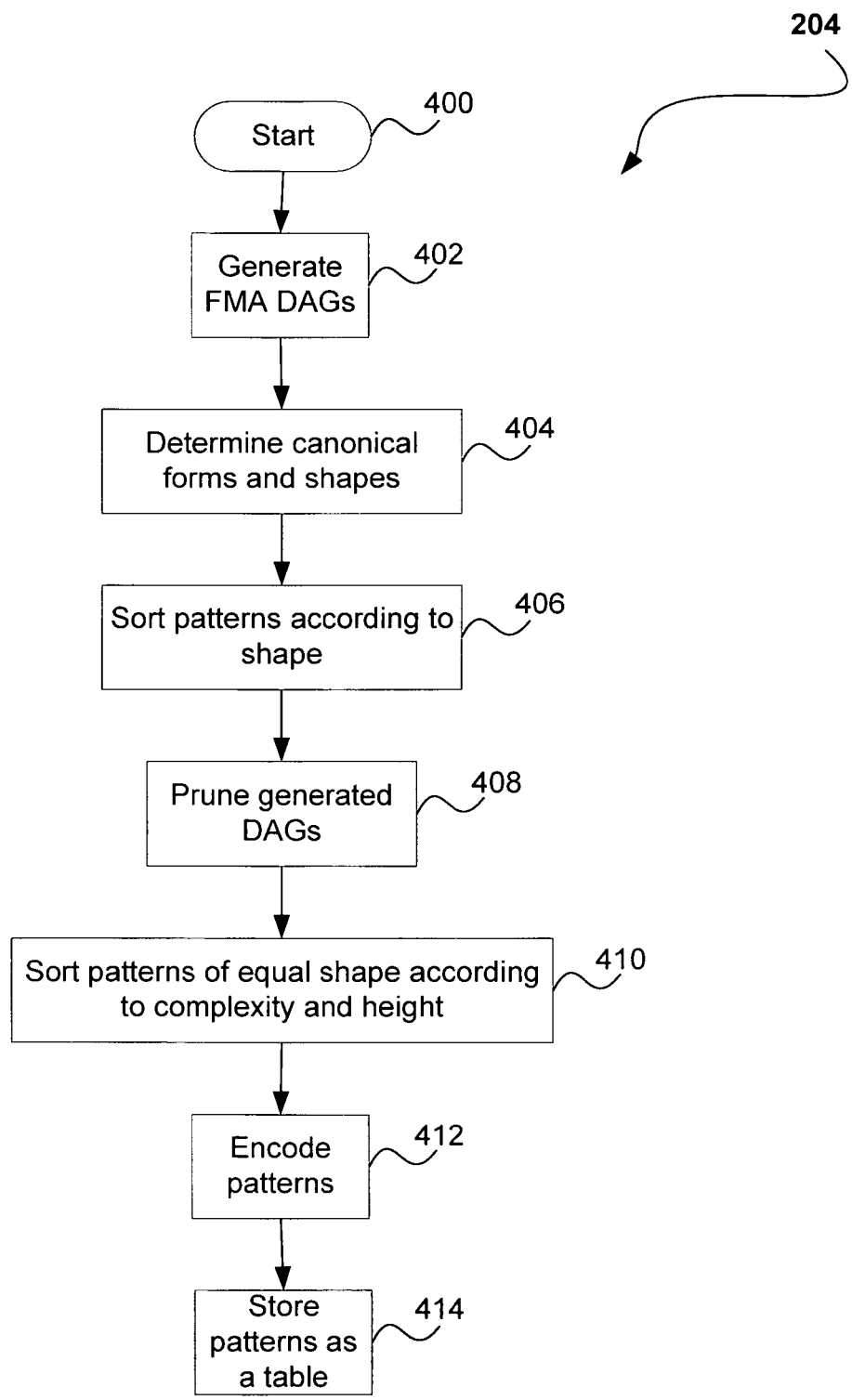
FIG. 4 is a flow diagram illustrating an exemplary method for generating a table of patterns according to an embodiment of the present invention.

FIG. 4 is a flow diagram 204 illustrating an exemplary method for generating a table of patterns according to an embodiment of the present invention. The invention is not limited to the embodiment described herein with respect to flow diagram 204. Rather, it will be apparent to persons skilled in the relevant art(s) after reading the teachings provided herein that other functional flow diagrams are within the scope of the invention. The generation of a table of patterns occurs during the compilation of the compiler. The process begins with block 400, where the process immediately proceeds to block 402.

In block 402 all possible FMA DAGs of a predefined complexity and less are generated. In one embodiment, FMA DAGs of complexity 5 (five) or less are generated. In generating all possible FMA DAGs, each FMA DAG must be acyclic and each terminal in the FMA DAG may only be used once. For example, an FMA DAG having two FMA instructions, F0 and F1, cannot have F0: +F1*a+b and F1: +a*c+d, because terminal a is used more than once in the FMA DAG. Another requirement in generating all possible FMA DAGs is that terminals cannot be skipped. For example, an FMA DAG having two FMA instructions, F0 and F1, cannot have F0:

+F1*a+b and F1: +d*e+f, because terminal c has been skipped. Also, the terminals in a pattern should be placed in order, that is, a, b, c, . . . . For each generated FMA DAG, the FMA DAG must be connected. For example, an FMA DAG having two FMA instructions, cannot have F0: +a*b+1 and F1: +c*d+0, because the two nodes do not connect. In other words, F0 does not connect to F1 because F1 is not found in the FMA instruction of F0. Methods similar to the generation of an FMA DAG are well known to those skilled in the relevant art(s). For example, methods for generating all words (character combinations) of length N are similar. The process then proceeds to block 404.

In block 404 canonical forms and shapes are determined for each FMA DAG. Canonical forms for each FMA DAG are determined by opening all parentheses and simplifying all algebraic instructions in the FMA DAG. In a canonical form all terminals are sorted within a product. For example, the product "bbaac" would not be an acceptable canonical form, but the product "aabbc" would be an acceptable canonical form. Also, in a canonical form all products are sorted lexicographically. For example, "bb+aa" would be sorted to read as "aa+bb". As indicated above, the shapes for each FMA DAG are determined by representing each terminal in the canonical form as a binary "1" and representing each operation as a binary "0". The process then proceeds to block 406.

In block 406, the generated patterns are sorted according to shape. The shapes are handled as integers written in binary form. The generated patterns are sorted accorded to the integer corresponding to shape. The process then proceeds to block 408.

In block 408, the generated FMA DAGs are pruned. Pruning of the FMA DAGs refers to eliminating duplicate FMA DAGs and sub-optimal FMA DAGs. Duplicate FMA DAGs are DAGs which have the same canonical form, the same complexity, and the same height. For example, a*1+b is equivalent to b*1+a. A sub-optimal FMA DAG may be an FMA DAG such as, but not limited to, 0*1+0. The process then proceeds to block 410.

In block 410, for each group of patterns of equal shape, the patterns are sorted according to complexity and height. As previously indicated, complexity refers to the number of FMA instructions in the FMA DAG. Height refers to the height of the FMA DAG or number of levels in the DAG. Note that the height of the root node is the height of the FMA DAG. The process then proceeds to block 412.

In block 412, each pattern is encoded into a 64-bit number, and then the patterns are written as a table and stored in a file (block 414).

In one embodiment of the present invention, FMA DAGs that are duplicates or suboptimal are removed during generation of the FMA DAGs.

Figure 5:
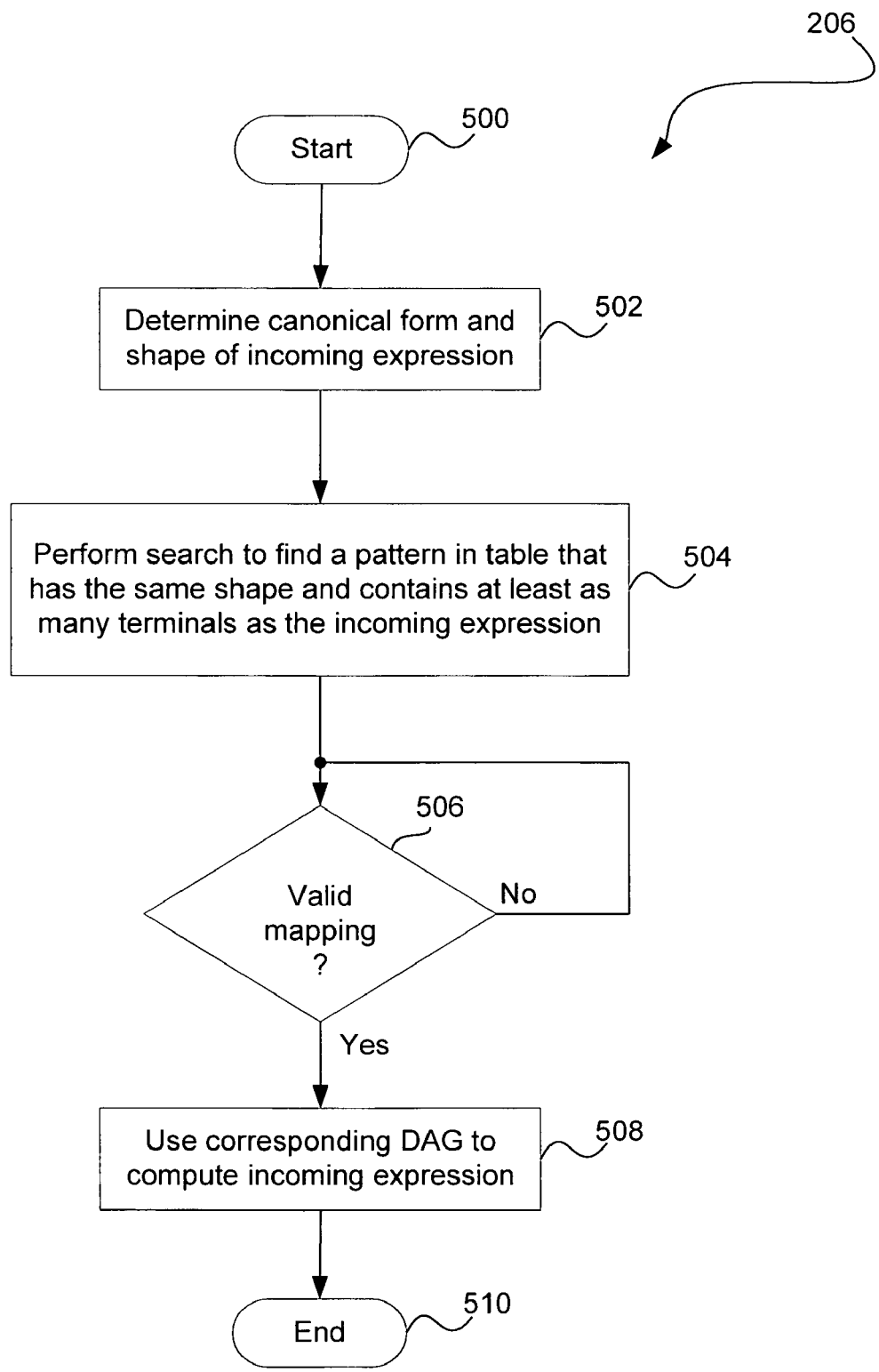
FIG. 5 is a flow diagram illustrating an exemplary method for pattern matching according to an embodiment of the present invention.

FIG. 5 is a flow diagram 206 illustrating an exemplary method for pattern matching according to an embodiment of the present invention. The invention is not limited to the embodiment described herein with respect to flow diagram 206. Rather, it will be apparent to persons skilled in the relevant art(s) after reading the teachings provided herein that other functional flow diagrams are within the scope of the invention. As indicated above, this portion of the invention, also referred to as pattern matching, occurs during compilation of a program. The process begins with block 500, where the process immediately proceeds to block 502.

In block 502, the canonical form and shape of an incoming expression is determined. In this instance, the canonical form may include subtractions and negations. The process proceeds to block 504.

In block 504, a search is performed to find a pattern in the table of generated patterns that has the same shape as the incoming expression and contains at least as many terminals as the incoming expression. The process then proceeds to block 506.

In decision block 506, for each generated pattern that is found, it is determined whether a valid mapping between the formal terminals in the canonical form of the found generated pattern and the actual terminals in the canonical form of the incoming expression exists.

In one embodiment, a recursive depth first search may be used to determine mapping between formal terminals and actual terminals. Recursive depth search methods are similar to well known recursive methods for solving the "8 queens" problem. The recursive depth search algorithm maps one formal terminal at a time. At some point, at least one or more formal terminals have been mapped, but not all formal terminals have been mapped. This is referred to as partial mapping. With partial mapping the order of terminals is essential. It guarantees that terminals available later will be used later. For partial mapping, the current formal terminal mapped to a corresponding actual terminal must be checked using a plurality of invariants to determine whether valid mapping of the pre-computed canonical form should be continued or whether the next partial mapping should be tried. The invariants include, but are not limited to, the following: (0) the number of products in which a parameter (i.e., terminal) is used; (1) the number of times the parameter was encountered in the expression; (2) the maximal power the parameter was raised to; (3) the minimal non-zero power the parameter was raised to; (4) the maximal power of the product containing the parameter; and (5) the sum of powers of all products containing the parameter. Note that values for the invariants of each parameter in the incoming canonical expression (actual terminals) are determined before the value of the invariants for the current mapping of a parameter in the pre-computed canonical form (formal terminal) are determined. The value for each of the invariants for the formal terminal should be less than or equal to the value of the invariants for the corresponding actual terminal in which the formal terminal is mapped. If the value of any of the invariants for the formal terminal is greater than the value of the invariant for the corresponding actual terminal, then the partial mapping of the current pre-computed canonical form is not good. Thus, if the partial mapping is not good, we proceed with next partial mapping. Exemplary code for the recursive depth search method is shown below.

```
// Try to map i-th formal. Should be called as TRY(0)
// NF -- number of formals, NA -- number of actuals.
void TRY(int i)
{
   if(i == 0) {/* clear the mapping*/}
   // at this point we mapped first i formals: 0, 1, ... i-1
   if(i == NF) {
      // We mapped NF formals, i.e a full mapping is found.
      // Replace terminals in the DAG using this mapping.
      // Try all 3^complexity sign combinations in the DAG.
      // If with some sign combination the canonical form of the dag is
      // equal to the incoming canonical form, then we found a valid
      // mapping and sign combination: stop searching.
      return;
   }
   // At this point we have to decide whether we want to continue
   // with this partial mapping.
   if(!PARTIAL_MAPPING_IS_GOOD( )){
      return;
   }
```

```
// try to map i-th formal to each actual [0..NA)
// The order is essential: it guaranties that terminals
// available later will be used later.
    for(int a = 0; a < NA; a++){
        // update the mapping: map i-th formal to 'a'
        TRY(i+1);
    }
}
// We have a partial mapping between formals and actuals.
// Return false if we can prove that this partial mapping
// can not be a part of valid mapping for the given formal and actual
canonical forms.
bool PARTIAL_MAPPING_IS_GOOD( )
{
// A number of properties are computed for each terminal,
// e.g. maximal/minimal power of terminal in expression, number of
// products in which the terminal is used, set of valid neighbors
// (terminals used in the products where this terminal is used), etc.
// If the partial mapping contradicts any of these properties, return false.
}
```

In another embodiment, all possible mappings may be examined to find a valid mapping. Examining all possible mappings to find a valid mapping may be time consuming compared to the recursive depth first search method shown above.

Returning to decision block 506, if it is determined that the mapping is valid, then the terminals in the corresponding resulting DAG or sequence of instructions are replaced with the actual terminals and sign combinations are determined to find the correct sign combination and canonical form of the DAG equal to the incoming expression (block 508). In one embodiment of the invention, all possible sign combinations are tried to find the correct sign combination and canonical form of the DAG to provide the optimal sequence of FMA, FMS, and/or FNMA instructions for computing the incoming expression. The process then proceeds to block 510, where the process ends.

Returning to decision block 506, if it is determined that the mapping is not valid, the process remains at block 506, where it is determined whether the next pattern found is a valid mapping.

Figure 6:
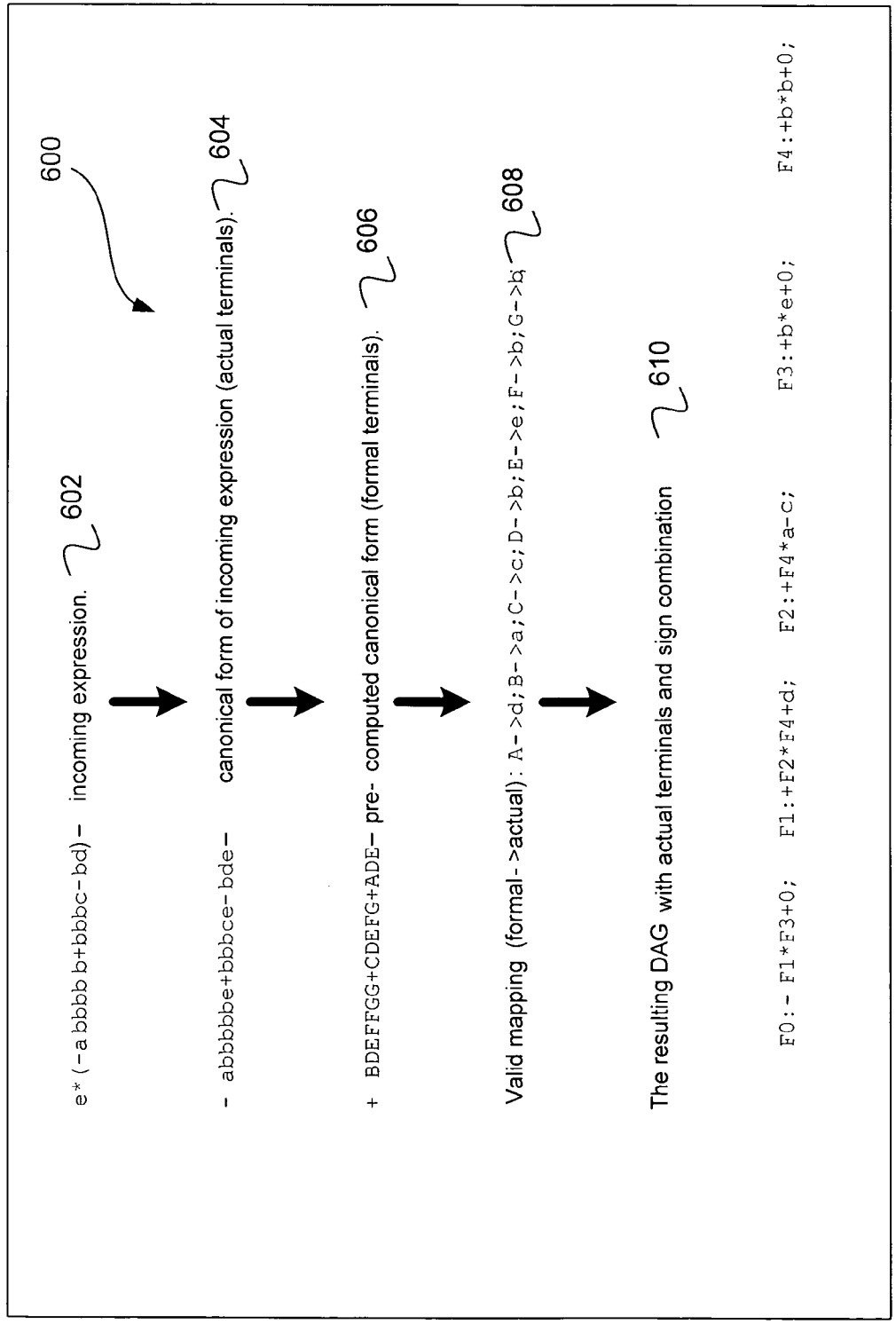
FIG. 6 is a diagram illustrating a valid mapping between a canonical form of an incoming expression (actual terminals) and a pre-computed canonical form (formal terminals) according to an embodiment of the present invention.

FIG. 6 is a diagram illustrating an exemplary valid mapping between a canonical form of an incoming expression (actual terminals) and a pre-computed canonical form (formal terminals) according to an embodiment of the present invention. As shown in FIG. 6, an incoming expression 602 is translated into its canonical form 604. The canonical form 604 of the incoming expression 602 shows the actual terminals used in the incoming expression (actual terminals are a, b, c, d, and e). A pre-computed canonical form with formal terminals 606 (formal terminals are A, B, C, D, E, F, and G) is obtained from searching the generated table of patterns with a shape consistent with the shape of the incoming expression and with at least as many terminals as the incoming expression. The formal terminals are then mapped to the actual terminals as shown at 608. If a valid mapping occurs, then the incoming expression is computed using the resulting DAG 610 of the pre-computed canonical form with actual terminals and sign combinations.

Figure 7:
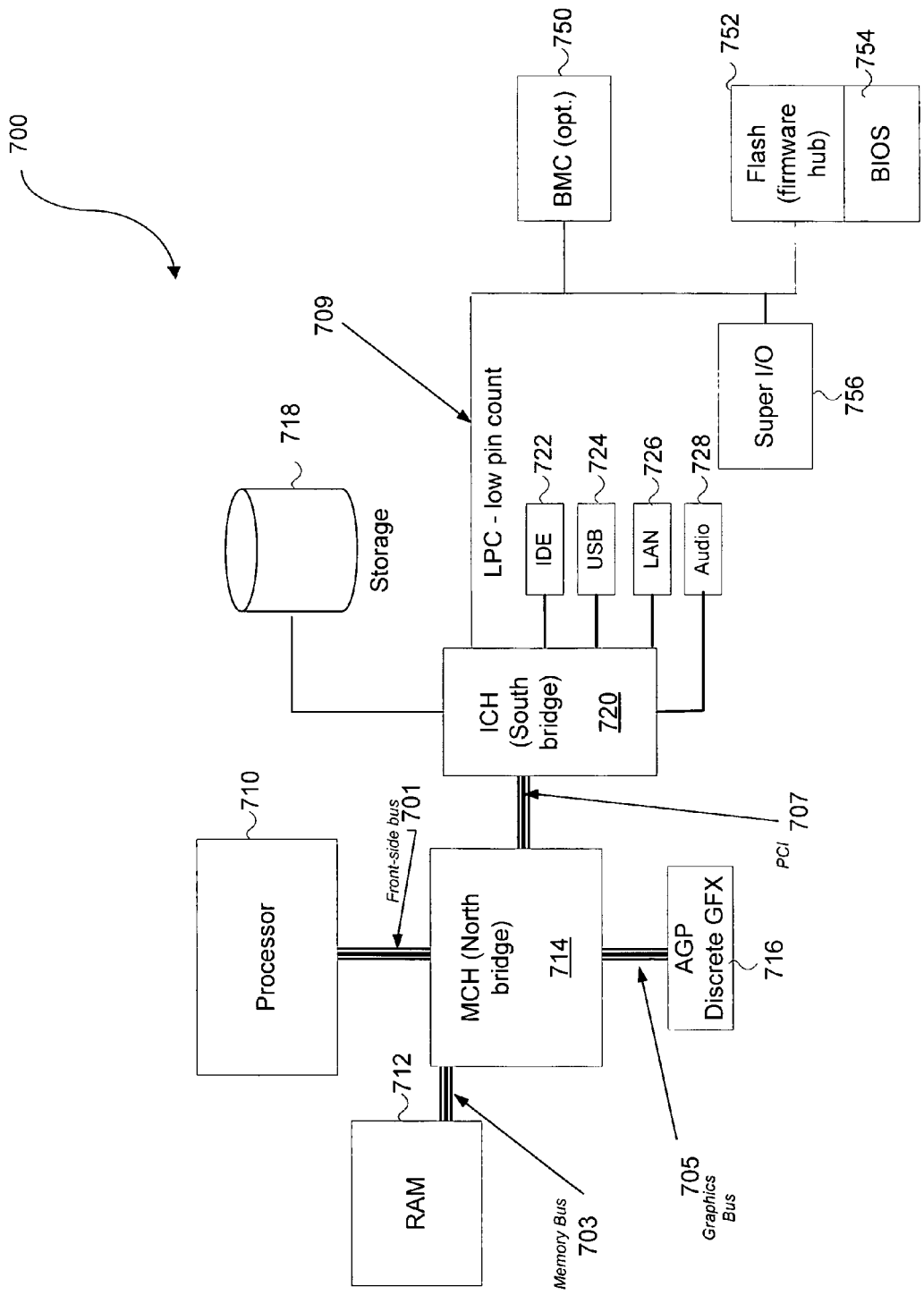
FIG. 7 is a diagram illustrating an exemplary computer system.

Embodiments of the present invention may be implemented using hardware, software, or a combination thereof and may be implemented in one or more computer systems or other processing systems. In fact, in one embodiment, the invention is directed toward one or more computer systems capable of carrying out the functionality described herein. An example implementation of a computer system 700 is shown in FIG. 7. Various embodiments are described in terms of this exemplary computer system 700. After reading this description, it will be apparent to a person skilled in the relevant art how to implement the invention using other computer systems and/or other computer architectures.

Computer system 700 includes one or more processors, such as processor 710. Processor 710 communicates with a memory controller hub (MCH) 714, also known as North bridge, via a front side bus 701. The MCH 714 communicates with system memory 712 via a memory bus 703. The MCH 714 may also communicate with an advanced graphics port (AGP) 716 via a graphics bus 705. The MCH 714 communicates with an I/O controller hub (ICH) 720, also known as South bridge, via a peripheral component interconnect (PCI) bus 707. The ICH 720 may be coupled to one or more components such as PCI hard drives (not shown), a storage component 718, legacy components such as IDE 722, USB 724, LAN 726 and Audio 728, and a Super I/O (SIO) controller 756 via a low pin count (LPC) bus 756.

Processor 710 may be an IA64 (Itanium) processor manufactured by Intel Corporation, located in Santa Clara, Calif., or any other type of processor capable of carrying out the methods disclosed herein. Though FIG. 7 shows only one such processor 710, there may be one or more processors in platform hardware 700 and one or more of the processors may include multiple threads, multiple cores, or the like.

Memory 712 may be a hard disk, a floppy disk, random access memory (RAM), read only memory (ROM), flash memory, or any other type of medium readable by processor 710. Memory 712 may store instructions for performing the execution of method embodiments of the present invention.

Storage device 718 may be a hard disk, a floppy disk, or any other type of medium readable by processor 710. In embodiments of the present invention, storage device 718 may store the table of FMA patterns that are generated once.

Non-volatile memory, such as Flash memory 752, may be coupled to the controller via a low pin count (LPC) bus 709. The BIOS firmware 754 typically resides in the Flash memory 752 and boot up will execute instructions from the Flash, or firmware.

In some embodiments, platform 700 is a server enabling server management tasks. This platform embodiment may have a baseboard management controller (BMC) 750 coupled to the ICH 720 via the LPC 709.

Figure 8:
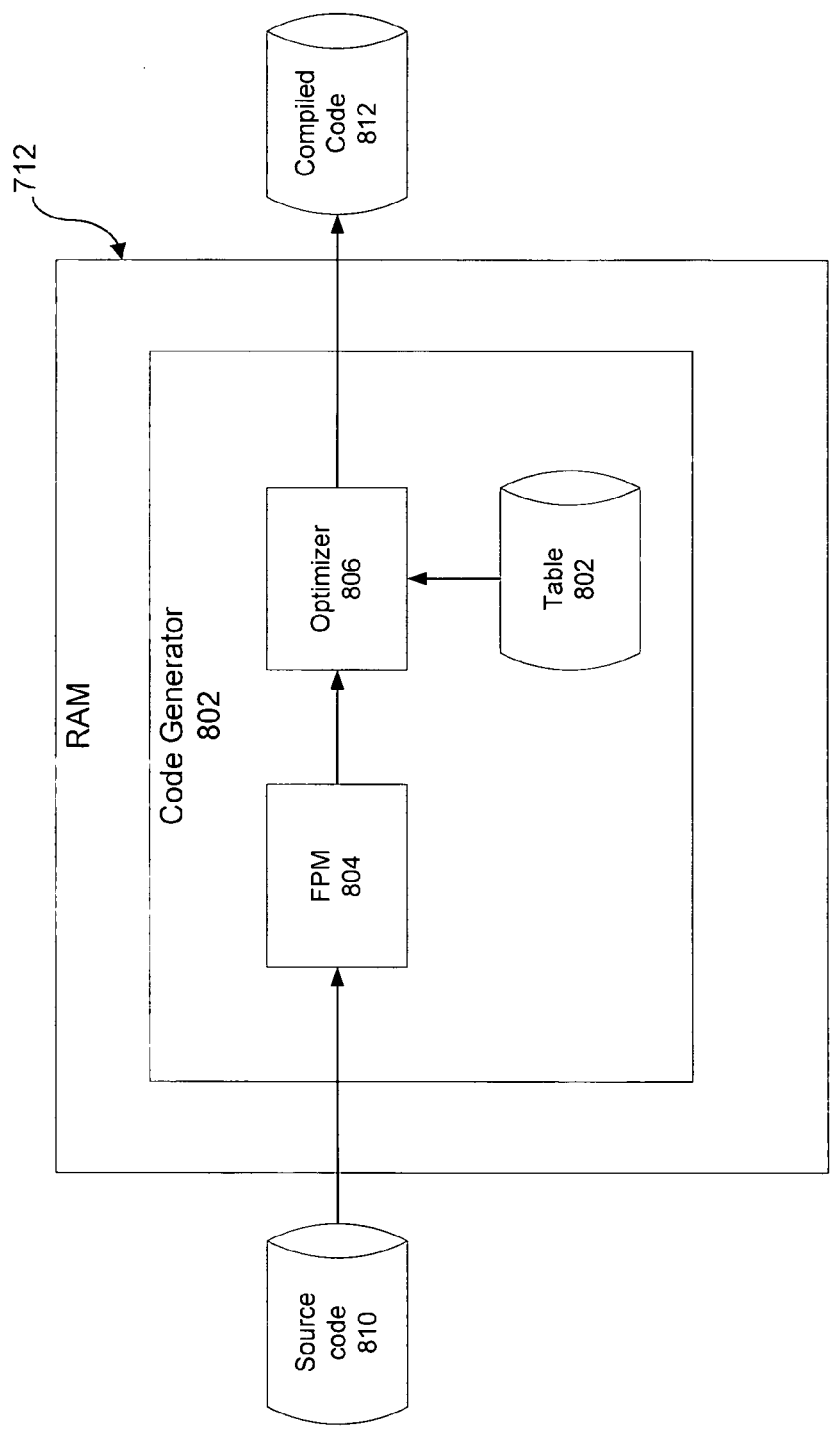
FIG. 8 is a block diagram illustrating an exemplary random access memory having a code generator for carrying out the methods described herein.

FIG. 8 is a block diagram 800 illustrating an exemplary random access memory 712 having a code generator 802, wherein the processor 710 in conjunction with the random access memory 712 carry out the methods described herein. Random access memory 712 comprises a code generator 802. Code generator 802 receives as input source code 810. Processor 710 enables the code generator 802 to generate compiled code 812 as output. Source code 810 and compiled code 812 may be stored on a disk or on storage device 718. Code generator 802 may include a floating-point module (FPM) 804, an optimizer 806, and a table 808. In one embodiment, the floating-point module 804 is part of the optimizer 806. Processor 710 enables floating-point module 804 to identify and extract floating-point expressions from the source code 810 and provide the floating-point expressions to the optimizer 806. Processor 710 also enables optimizer 806 to determine an optimal set of fused instructions (FMA, FMS, and FNMA instructions) for the floating-point expressions received from FPM 804 using the methods described herein of matching the given floating-point expression against patterns found in table 808 during compilation of source code 810. Table 808 is a copy of the table of patterns that is generated once and stored in storage device 718 or some other storage device. Once the optimized instructions are generated, the optimized instructions are stored as compiled code 812. Compiled code 812 may also be stored in storage device 718 or some other storage device.

Embodiments of the present invention may be implemented using hardware, software, or a combination thereof and may be implemented in one or more computer systems, as shown in FIGS. 7 and 8, or other processing systems. The techniques described herein may find applicability in any computing, consumer electronics, or processing environment. The techniques may be implemented in programs executing on programmable machines such as mobile or stationary computers, personal digital assistants, set top boxes, cellular telephones and pagers, consumer electronics devices (including DVD (Digital Video Disc) players, personal video recorders, personal video players, satellite receivers, stereo receivers, cable TV receivers), and other electronic devices that may include a processor, a storage medium accessible by the processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that the invention can be practiced with various system configurations, including multiprocessor systems, minicomputers, mainframe computers, independent consumer electronics devices, and the like. The invention can also be practiced in distributed computing environments where tasks or portions thereof may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine accessible medium having stored thereon instructions that may be used to program a processing system or other electronic device to perform the methods. The term "machine accessible medium" used herein shall include any medium that is capable of storing or encoding a sequence of instructions for execution by the machine and that cause the machine to perform any one of the methods described herein. The term "machine accessible medium" shall accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system to cause the processor to perform an action or produce a result.

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined in accordance with the following claims and their equivalents.

What is claimed is:

1. A computer implemented code generation method, comprising:
   a compiler generating a table of patterns, each pattern in the table comprising an FMA (fused multiply-add) DAG (Directed Acyclic Graph), a canonical form equivalent of the FMA DAG, and a shape corresponding to the canonical form equivalent; and
   matching a DAG representing incoming floating point expressions in a source code program received by the compiler against the patterns in the table of patterns during compilation of the program;
   the compiler generating a sequence of optimized FMA instructions to compute the floating-point expressions.

2. The method of claim 1, wherein generating the table of patterns occurs once during compilation of the compiler.

3. The method of claim 1, wherein the FMA DAG comprises a sequence of FMA instructions that form a Directed Acyclic Graph.

4. The method of claim 3 wherein arguments for each instruction in the sequence of FMA instructions comprise a number of terminals and constants one (1) and zero (0), wherein each terminal appears once in the sequence of FMA instructions and the FMA DAG includes at least one node.

5. The method of claim 1, wherein the canonical form equivalent of the FMA DAG comprises a sum of products of the terminals, wherein all of the terminals are sorted within a product and all products are sorted lexicographically.

6. The method of claim 1, wherein the shape comprises a binary representation of the canonical form equivalent in which all terminals in the canonical form equivalent are replaced with a binary "1" and all operation signs in the canonical form equivalent are replaced with a binary "0".

7. The method of claim 1, wherein generating a table of patterns comprises:
   generating all possible FMA DAGs of a predefined complexity or less;
   determining canonical forms and shapes for each FMA DAG;
   sorting the generated FMA DAGs according to shape;
   pruning the generated FMA DAGs;
   sorting each group of shapes according to complexity and height;
   encoding each FMA DAG as a pattern comprising a 64-bit number; and
   storing the patterns as a table in a file.

8. The method of claim 7, wherein generating all possible FMA DAGs of a predetermined complexity or less includes generating all possible FMA DAGs of complexity 5 or less.

9. The method of claim 7, wherein shapes are handled as integers written in binary form.

10. The method of claim 7, wherein pruning the generated FMA DAGs comprises eliminating duplicate FMA DAGs and sub-optimal FMA DAGs.

11. The method of claim 10, wherein duplicate FMA DAGs comprise DAGs which have the same canonical form, the same complexity, and the same height.

12. The method of claim 11, wherein complexity comprises the number of FMA instructions in the FMA DAG and height comprises the number of levels in the FMA DAG.

13. The method of claim 1, wherein matching incoming floating point expressions against the patterns in the table of patterns during compilation of a program comprises:
   determining a canonical form and shape for an incoming floating-point expression;
   finding a pattern in the table of generated patterns that has the same shape as the incoming floating-point expression and at least as many terminals as the incoming floating-point expression;
   determining whether a valid mapping exists between formal terminals and actual terminals, wherein formal terminals are terminals from the pattern that was found and actual terminals are terminals from the canonical form of the incoming floating-point expression; and
   if the mapping is valid, then replacing the terminals in the corresponding FMA DAG with the actual terminals and determining sign combinations to find the correct sign combination and canonical form of the DAG equal to the incoming expression.

14. The method of claim 13, further comprising if it is determined that a valid mapping does not exist, then repeating the finding process and the valid mapping determination process until the mapping is valid.

15. The method of claim 13, wherein if the mapping is valid, the method further comprises providing an optimized sequence of FMA (fused multiply-add), FMS (fused multiply-subtract), and/or FNMA (fused negate multiply-add) instructions as compiled code for computing the incoming expression.

16. The method of claim 15, wherein the optimal sequence of FMA, FMS, and/or FNMA instructions comprise minimal complexity, minimal latency, and argument availability, wherein minimal complexity requires the number of instructions in the sequence of instructions to be minimal, wherein minimal latency requires the height of the DAG to be minimal when compared to all possible DAGs with minimal complexity, and wherein argument availability requires smaller terminals to be placed as close to the root node of the DAG as possible while still preserving the minimal complexity and the minimal latency when a strict order is placed on the set of terminals in the DAG.

17. An article comprising:
   a non-transitory storage medium having a plurality of machine accessible instructions, wherein when the instructions are executed by a processor, the instructions provide for generating a table of patterns, each pattern in the table comprising an FMA (fused multiply-add) DAG (Directed Acyclic Graph), a canonical form equivalent of the FMA DAG, and a shape corresponding to the canonical form equivalent;
   matching a DAG representing incoming floating point expressions in a source code program received by a compiler against the patterns in the table of patterns during compilation of a program; and
   generating a sequence of optimized FMA instructions to compute the floating-point expressions.

18. The article of claim 17, wherein generating the table of patterns occurs once during compilation of the compiler.

19. The article of claim 17, wherein the FMA DAG comprises a sequence of FMA instructions that form a Directed Acyclic Graph.

20. The article of claim 19, wherein arguments for each instruction in the sequence of FMA instructions comprise a number of terminals and constants one (1) and zero (0), wherein each terminal appears once in the sequence of FMA instructions and the FMA DAG includes at least one node.

21. The article of claim 17, wherein the canonical form equivalent of the FMA DAG comprises a sum of products of the terminals.

22. The article of claim 17, wherein the shape comprises a binary representation of the canonical form equivalent in which all terminals in the canonical form equivalent are replaced with a binary "1" and all operation signs in the canonical form equivalent are replaced with a binary "0".

23. The article of claim 17, wherein instructions for generating a table of patterns comprises instructions for:
   generating all possible FMA DAGs of a predefined complexity or less;
   determining canonical forms and shapes for each FMA DAG;
   sorting the generated FMA DAGs according to shape;
   pruning the generated FMA DAGs;
   sorting each group of shapes according to complexity and height;
   encoding each FMA DAG as a pattern comprising a 64-bit number; and
   storing the patterns as a table in a file.

24. The article of claim 23, wherein instructions for generating all possible FMA DAGs of a predetermined complexity or less includes instructions for generating all possible FMA DAGs of complexity 5 or less.

25. The article of claim 23, wherein shapes are handled as integers written in binary form.

26. The article of claim 23, wherein instructions for pruning the generated FMA DAGs comprises instructions for eliminating duplicate FMA DAGs and sub-optimal FMA DAGs.

27. The article of claim 26, wherein duplicate FMA DAGs comprise DAGs which have the same canonical form, the same complexity, and the same height.

28. The article of claim 27, wherein complexity comprises the number of FMA instructions in the FMA DAG and height comprises the number of levels in the FMA DAG.

29. The article of claim 17, wherein instructions for matching incoming floating point expressions against the patterns in the table of patterns during compilation of a program comprises instructions for:
   determining a canonical form and shape for an incoming floating-point expression;
   finding a pattern in the table of generated patterns that has the same shape as the incoming floating-point expression and at least as many terminals as the incoming floating-point expression;
   determining whether a valid mapping exists between formal terminals and actual terminals, wherein formal terminals are terminals from the pattern that was found and actual terminals are terminals from the canonical form of the incoming floating-point expression; and
   if the mapping is valid, then replacing the terminals in the corresponding FMA DAG with the actual terminals and determining sign combinations to find the correct sign combination and canonical form of the DAG equal to the incoming expression.

30. The article of claim 29, further comprising instructions for if it is determined that a valid mapping does not exist, then repeating the finding process and the valid mapping determination process until the mapping is valid.

31. The article of claim 29, wherein if the mapping is valid, the instructions further comprising instructions for providing an optimized sequence of FMA (fused multiply-add), FMS (fused multiply-subtract), and/or FNMA (fused negate multiply-add) instructions as compiled code for computing the incoming expression.

32. The article of claim 31, wherein the optimal sequence of FMA, FMS, and/or FNMA instructions comprise minimal complexity, minimal latency, and argument availability, wherein minimal complexity requires the number of instructions in the sequence of instructions to be minimal, wherein minimal latency requires the height of the DAG to be minimal when compared to all possible DAGs with minimal complexity, and wherein argument availability requires smaller terminals to be placed as close to the root node of the DAG as possible while still preserving the minimal complexity and the minimal latency when a strict order is placed on the set of terminals in the DAG.

33. A code generation system, comprising:
  a processor having an instructions set comprising fused instructions;
  a memory, the memory comprising a code generator having a floating-point module coupled to an optimizer and a table of patterns coupled to the optimizer,
  each pattern in the table comprising one of a FMA (fused multiply-add), FMS (fused multiply-subtract), or FNMA (fused negate multiply-add) instruction DAG (Directed Acyclic Graph), a canonical form equivalent of the FMA, FMS or FNMA DAG, and a shape corresponding to the canonical form equivalent;
  the code generator configured to receive floating-point expressions and to generate a sequence of optimized FMA, FMS, and/or FNMA instructions to compute the floating-point instruction.

34. The system of claim 33, wherein the floating-point module is configured to receive as input source code and to extract floating-point expressions from the source code.

35. The system of claim 33, wherein the optimizer is configured to receive the floating-point expression from the floating-point module and to determine a canonical form and shape for the input floating-point expression.

36. The system of claim 35, wherein the optimizer is configured to search the table of patterns to find a pattern having a canonical form, shape, and at least an equivalent amount of terminals in the DAG to that of the canonical form, shape, and terminals of the input floating-point expression.

37. The system of claim 36, wherein the optimizer is configured to determine whether a valid mapping exists between the terminals of the pattern and the terminals of a DAG representing the input floating-point expression, and if there is a valid mapping, the optimizer is further configured to replace the terminals in the corresponding DAG with the terminals from the DAG representing the input floating-point expression and to determine sign combinations to find a correct sign combination and canonical form of the DAG equal to the incoming expression.

38. The system of claim 37, wherein the optimizer is further configured to provide an optimized sequence of FMA (fused multiply-add), FMS (fused multiply-subtract), and/or FNMA (fused negate multiply-add) instructions based on the correct sign combination and canonical form of the DAG as compiled code for computing the incoming expression.

39. The system of claim 38, wherein the optimal sequence of FMA, FMS, and/or FNMA instructions comprise minimal complexity, minimal latency, and argument availability, wherein minimal complexity requires the number of instructions in the sequence of instructions to be minimal, wherein minimal latency requires the height of the DAG to be minimal when compared to all possible DAGs with minimal complexity, and wherein argument availability requires smaller terminals to be placed as close to the root node of the DAG as possible while still preserving the minimal complexity and the minimal latency when a strict order is placed on the set of terminals in the DAG.

* * * * *